(12) United States Patent
Charbonnel et al.

(10) Patent No.: US 11,650,580 B2
(45) Date of Patent: May 16, 2023

(54) MONITORING SYSTEM FOR ENGINE PERFORMANCE AND FAILURE PREDICTION

(71) Applicant: Caterpillar Inc., Peoria, IL (US)

(72) Inventors: Sylvain J. Charbonnel, Peoria, IL (US); Jayant K. Roplekar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/949,898

(22) Filed: Nov. 19, 2020

(65) Prior Publication Data
US 2022/0155772 A1 May 19, 2022

(51) Int. Cl.
*G05B 23/02* (2006.01)
*G06Q 10/00* (2012.01)
*G06N 20/00* (2019.01)
*G06Q 10/20* (2023.01)

(52) U.S. Cl.
CPC ....... *G05B 23/0283* (2013.01); *G05B 23/024* (2013.01); *G05B 23/0294* (2013.01); *G06N 20/00* (2019.01); *G06Q 10/20* (2013.01)

(58) Field of Classification Search
CPC .............. G05B 23/0283; G05B 23/024; G05B 23/0294; G06N 20/00; G06Q 10/20
See application file for complete search history.

(56) References Cited

U.S. PATENT DOCUMENTS

| | | |
|---|---|---|
| 2007/0150295 A1 | 6/2007 | Dawson et al. |
| 2014/0263261 A1 | 9/2014 | Hunt et al. |
| 2014/0324282 A1 | 10/2014 | Praher |
| 2019/0131607 A1 | 5/2019 | Gillette |
| 2019/0249578 A1 | 8/2019 | Prabhala et al. |
| 2020/0285997 A1* | 9/2020 | Bhattacharyya ......... G06N 7/00 |

FOREIGN PATENT DOCUMENTS

| | | |
|---|---|---|
| CN | 105928710 B | 2/2019 |
| CN | 110056427 A | 7/2019 |
| CN | 110673581 A | 1/2020 |
| CN | 112417758 A | 2/2021 |

OTHER PUBLICATIONS

UK International Search Report for Int'l. Patent Appln. No. GB2116021.3, dated Apr. 19, 2022 (3 pgs).

* cited by examiner

*Primary Examiner* — Roy Y Yi
*Assistant Examiner* — Geoffrey T Evans
(74) *Attorney, Agent, or Firm* — Bookoff McAndrews, PLLC (57) ABSTRACT

In some implementations, a remote monitoring system may receive historical usage data associated with a plurality of engines that are associated with a plurality of respective machines. The remote monitoring system may train an engine monitoring model to identify a usage profile that indicates potential failure by identifying an operational range of an operating parameter according to an operating profile. The remote monitoring system may receive, from a machine, usage data that includes a measurement of the operating parameter for an engine of the machine, and determine that the engine is configured to operate according to the operating profile. The remote monitoring system may predict, based on determining that the engine is configured to operate according to the operating profile and based on the measurement and the operational range, that the engine is likely to fail within a certain time period.

19 Claims, 3 Drawing Sheets

MONITORING SYSTEM FOR ENGINE PERFORMANCE AND FAILURE PREDICTION

TECHNICAL FIELD

The present disclosure relates generally to engine monitoring and, for example, to a monitoring system for engine performance and failure prediction.

BACKGROUND

Operating an engine (e.g., an engine of a power system) generally involves a trade-off between durability and performance. For example, the more aggressively an engine is operated for higher performance, the more likely that the engine is to be damaged at a faster rate (or lose durability) relative to the engine being operated less aggressively and/or operated for lower performance. Cumulative damage to the engine reduces the lifetime of the engine. In previous techniques, the engine can be continuously monitored via a model to determine an operating state of the engine and a corresponding status to the engine relative to parameters of the model. However, problems arise with monitoring for damage when unforeseen actions and/or operations of the engine cause the model to be inaccurate with respect to predictability or determining a cumulative damage. Furthermore, such a model may detect damage to the engine after a level of damage to the engine has reached a catastrophic level or a level that reduces a useful life of the engine.

Additionally, an operator, under certain circumstances (e.g. certain types of weather events, certain location-specific circumstances, certain usage or operations, or the like) may determine that a possibility of failure is acceptable. For example, the operator may desire that performance is to be optimized (e.g., relative to preventing damage) under such circumstances, thereby, causing a monitoring model to permit operation of the engine in accordance with optimizing performance. However, similar to the above, certain unforeseen actions and/or operations of the engine may cause the model to be inaccurate with respect to configuring the engine to operate for optimized performance, thereby reducing effectiveness and/or efficiencies of operations performed by machines associated with the engine.

For example, U.S. Patent Application Publication No. 2019/131607 discloses a device for remote engine monitoring that can store and/or display data concerning monitored engine characteristics, and/or send such data to a location removed from the engine. While the device allows for remote engine monitoring, a baseline standard operating range is determined for individual assets, and events outside of standard operating parameters may be detected for the individual assets.

The remote monitoring system of the present disclosure solves one or more of the problems set forth above and/or other problems in the art.

SUMMARY

In some implementations, a method includes receiving historical usage data associated with a plurality of engines, of an engine type, that are associated with a plurality of respective machines; training, based on the historical usage data, an engine monitoring model to identify a usage profile that indicates potential failure of the engine type, wherein the usage profile identifies an operational range of an operating parameter for the engine type according to an operating profile associated with operating one or more of the plurality of engines; receiving, from a machine, usage data that includes a measurement of the operating parameter for an engine of the machine; determining that the engine is configured to operate according to the operating profile; predicting, based on determining that the engine is configured to operate according to the operating profile, and based on the measurement and the operational range, that the engine is likely to fail within a certain time period; and performing an action associated with the machine.

In some implementations, a device includes one or more memories and one or more processors configured to: receive, from onboard engine monitoring systems of a plurality of respective machines, usage data associated with engines of the plurality of respective machines; determine, from the usage data, that a subset of engines associated with the plurality of respective machines are configured to operate according to an operating profile; determine, for an operating parameter and from the usage data, an operational range based on measurements of the operating parameter that are associated with usage of the subset of engines; receive, from an onboard engine monitoring system associated with a machine of the plurality of respective machines, a measurement of the operating parameter for an engine of the machine; determine, based on the measurement and the operational range, that the engine is likely to fail; and perform an action associated with the machine.

In some implementations, a non-transitory computer-readable medium storing a set of instructions includes one or more instructions that, when executed by one or more processors of a device, cause the device to: receive, from an onboard engine monitoring system of a machine, a notification that a measurement of an operating parameter of an engine of the machine is outside of an operational range of the machine; determine, from the notification, that the engine is configured to operate according to an operating profile that is associated with the operational range; identify historical usage data associated with the engine based on the historical usage data being mapped, in a data structure, to an identifier associated with the engine; determine, from the historical usage data, a measurement pattern associated with the operating parameter; determine an optimal operational configuration based on the measurement, the measurement pattern, and other historical usage data that is associated with a plurality of other machines; and perform an action associated with the machine and the optimal operational configuration.

DETAILED DESCRIPTION

This disclosure relates to a remote monitoring system and/or an engine monitoring system, which is applicable to any machine that includes an engine controlled according to one or more operating profiles that provide optimized control of the engine. For example, the machine may be a vehicle, a compactor machine, a paving machine, a cold planer, a grading machine, a backhoe loader, a wheel loader, a harvester, an excavator, a motor grader, a skid steer loader, a tractor, a dozer, a generator, a genset, and/or the like.

Figure 1:
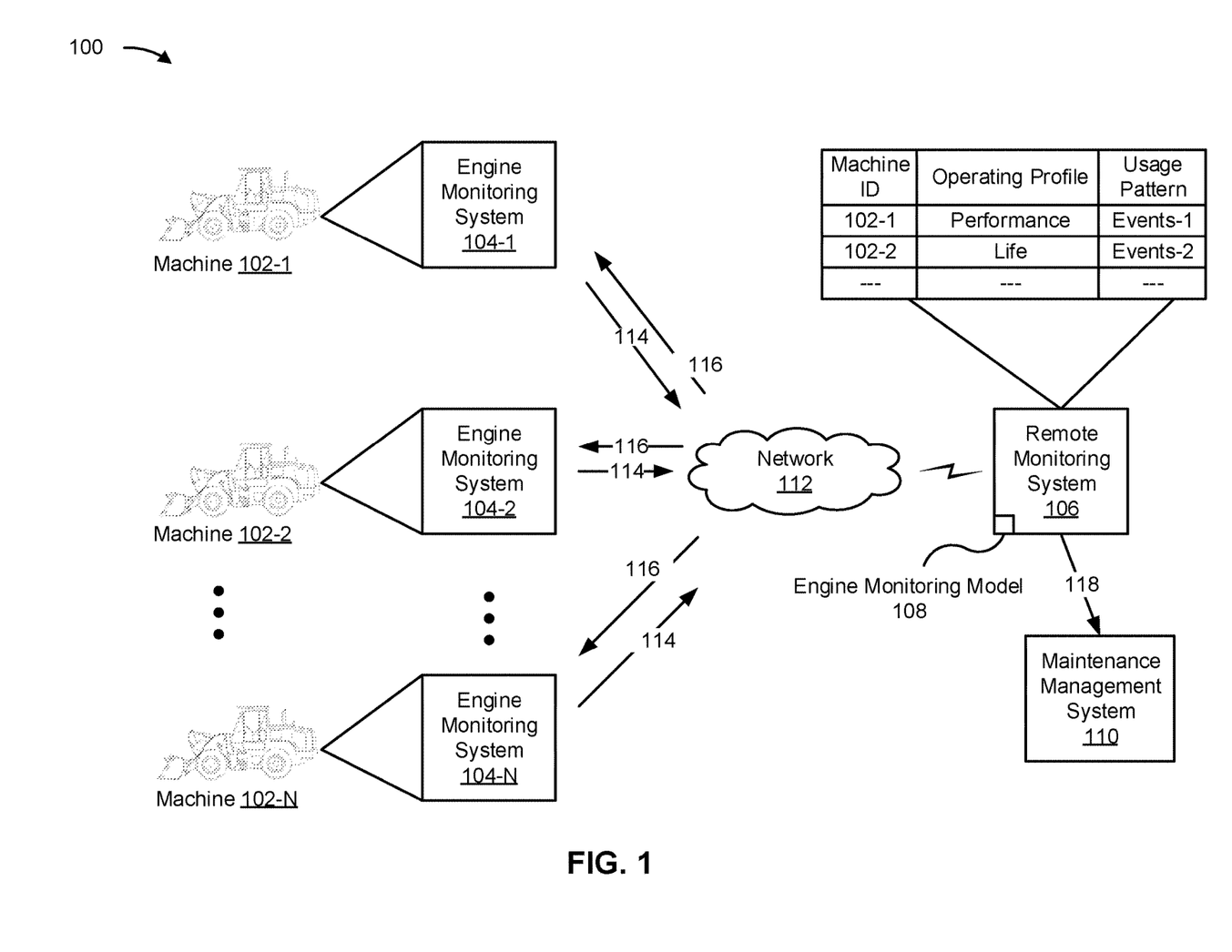
FIG. 1 is a diagram of an example implementation of a remote monitoring system described herein.

FIG. 1 is a diagram of an example 100 associated with a remote monitoring system described herein. As shown in FIG. 1, example 100 includes N machines 102 (shown as 102-1 to 102-N, where N is an integer and N≥1) (referred to herein individually as the "machine 102," and collectively as the "machines 102") that include respective engine monitoring systems 104 (shown as 104-1 to 104-N) (referred to herein individually as the "engine monitoring system 104," and collectively as the "engine monitoring systems 104"). As further shown in FIG. 1, example 100 includes a remote monitoring system 106 that includes an engine monitoring model 108 and a maintenance management system 110. One or more of the example machines, devices, or components of FIG. 1 may communicate wirelessly via a network 112 (e.g., a wireless communication network).

As described herein, the engine monitoring systems 104 may provide, via the network, usage data 114 to the remote monitoring system 106. Based on the usage data 114 and one or more example processes for predicting a failure described herein, the remote monitoring system 106 may determine and/or transmit communications 116 (e.g., messages, notifications, instructions, and/or the like) to the engine monitoring systems 104 to prevent a likely failure from occurring within a certain period of time.

In example 100, the remote monitoring system 106 may include a data structure that maps identifiers of the machines 102 to respective operating profiles of the machines 102 and/or usage patterns of the machines 102. For example, an operating profile may identify a set or configuration of operational ranges of one or more operating parameters, such as engine speed, load, or the like. Additionally, or alternatively, an operating profile may identify certain measured indicators (e.g., sensor measurements) and/or inferred physical indicators (e.g., measured temperatures, measured pressures associated with certain components of the engine. The usage patterns may include information associated with certain events associated with measuring and/or monitoring one or more operating parameters of engines of the machines. More specifically, the usage patterns may include information and/or data in the form of histograms associated with time that operating parameters were measured and/or sensed at certain levels and/or histograms associated with when or where the operating parameters exceeded certain thresholds (which may be dynamically evaluated). The maintenance management system 110, as described herein, may include one or more devices and/or platforms that are capable of facilitating scheduling a maintenance service, ordering parts and/or materials for a maintenance service, and/or providing a maintenance service (e.g., to extend the useful life of each of the engines of the machines 102 and, correspondingly, extend the useful life of each of the machines 102) based on receiving maintenance information 118 (e.g., in a request for maintenance). The maintenance information 118 may include a type of maintenance that is required, replacement parts that are required for the maintenance service, a location of the maintenance service, and/or the like.

The network 112 includes one or more wired and/or wireless networks. For example, the network 112 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 112 enables communication among the devices of environment 100.

Figure 2:
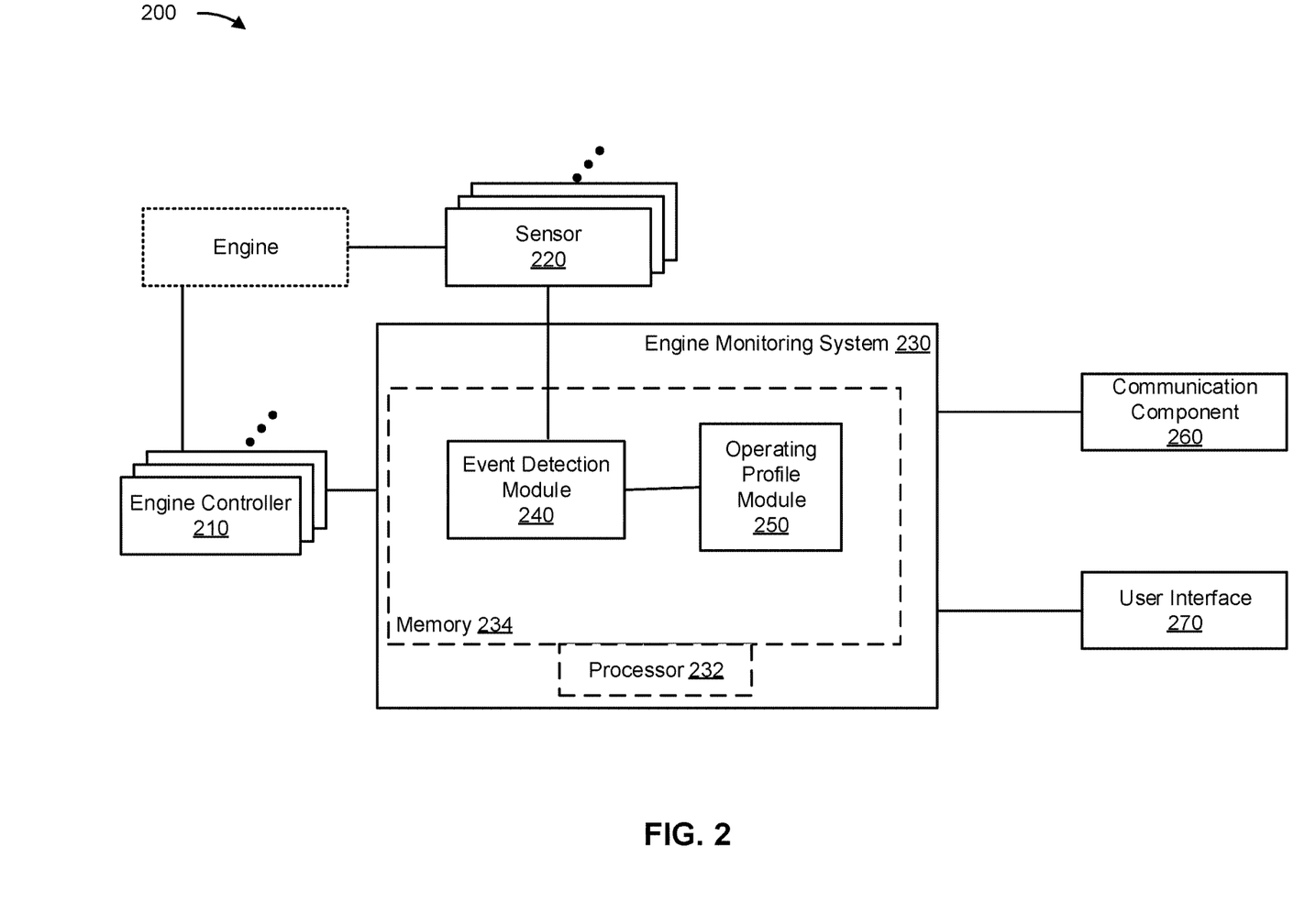
FIG. 2 is a diagram of an example of an engine monitoring system described herein.

The engine monitoring system 104 may include one or more devices that are onboard the machine 102, and is configured to monitor a performance of the machines 102 by obtaining measurements of one or more operating parameters of the machine 102, as described herein at least in connection with FIG. 2. The engine monitoring systems 104 may transmit, to the remote monitoring system 106, the measurements as usage data of the machine 102 to permit the remote monitoring system 106 to analyze the usage data and/or predict a failure associated with an engine of the machine 102 based on the measurements and/or historical usage data associated with the machine 102 (and/or one or more sets of the machines 102).

In this way, the remote monitoring system 106 may receive usage data associated with the engines of the respective machines 102, classify and/or sort the usage data (e.g., based on machine identifiers, machine types, operating profiles of the machines, and/or the like), and/or store the usage data in the data structure of the remote monitoring system 106. The remote monitoring system 106 may determine, from the usage data (e.g., based on an indicated setting of the engine in the usage data), that measurements associated with an operating parameter were obtained when the engine was operating according to an operating profile. The operating profile (or each individual operating profile that is configured for operation of the machine) may indicate a setting (e.g., that corresponds to an operator preference, a default setting, and/or the like) associated with optimizing performance of the engine (e.g., to maximize power, to maximize torque, to maximize speed, to maximize responsiveness, and/or the like), a setting to optimize a useful life of the engine (e.g., to conserve resources of the engine, to prevent drastic changes in operating parameters that cause damage to the engine, and/or the like), and/or a setting to balance between certain desired optimizations.

As described herein, the remote monitoring system 106 may determine an operational range based on measurements of the operating parameter. The operating parameter may include a speed of a component of the engine, a temperature of a component of the engine, an emissions metric associated with exhaust from the engine (e.g., a measure of status of an emissions component, such as a filter, a measure of a quantity of certain types of emitted particle within the exhaust, or the like), or an intake metric associated with an intake of the engine (e.g., an intake pressure, an intake temperature, or the like). The remote monitoring system 106 may analyze usage data (e.g., received over a most recent set of days, weeks, months, years, and/or the like) from the machines 102 to determine the operational range. In some implementations, the remote monitoring system 106 selects a most relevant set of usage data to determine an operational range for an operating parameter. For example, the remote monitoring system 106 may select usage data for engines and/or machines 102 that includes measurements of the engines and/or machines 102 when the machines 102 are operated in a same region, location, worksite, and/or the like. Additionally, or alternatively, the remote monitoring system 106 may select usage data that includes measurements of the engines and/or machines 102 when performing a same type of operation as received notification or measurement.

As shown in FIG. 1, the remote monitoring system 106 may include an engine monitoring model 108. The engine monitoring model 108 may include and/or utilize one or more types of machine learning models, such as one or more types of neural networks, one or more types of linear regression models, one or more types of supervised or unsupervised learning models, one or more types of classification models, one or more types of similarity models, one or more types of clustering models, and/or the like. The remote monitoring system 106 (and/or another platform associated with the remote monitoring system 106) may train the engine monitoring model based on historical usage data (e.g., usage data received during a training period associated the machine learning models) associated with the machines 102 and/or received from one or more of the engine monitoring systems 104. In some implementations, the remote monitoring system is trained using a product health database that includes historical data that identifies information associated with known historical failures and/or historical performance of operations augmented with corresponding measured or simulated operating parameter values.

The engine monitoring model 108 may be trained using historical data that is associated with identifying an operational range (e.g., a desired range according to a particular operating profile of the engine) of an operating parameter based on historical values for one or more indication metrics. Such indication metrics may include a type of the engine, an operating profile of the engine, a usage amount of the engine (e.g., work hours, load, or the like), a usage rate of the engine, a date or year of manufacture of the engine, a location of operation of the engine, a type of operation performed by the machine 102, a performance metric of the engine (e.g., measured output speed, torque, power, or the like) and/or the like. The indication metrics may be associated with indicating a potential failure of the engine and/or a potential underperformance of the engine.

Using the historical data and values for the one or more failure indication metrics as inputs to the engine monitoring model 108, the remote monitoring system 106 may determine an operational range (e.g., an optimal operational range) for an engine (or a type of an engine) based on usage data associated with historical usage of a plurality of machines, to permit the remote monitoring system 106 to predict that a failure is likely to occur and/or when the failure is likely to occur (e.g., within a certain quantity of hours, days, weeks, and/or the like), as described herein. In some implementations, as described herein, the remote monitoring system 106 may retrain the engine monitoring model 108 by updating the historical usage data to include validated or invalidated results associated with input values of the one or more failure indication parameters.

Accordingly, during operation, the remote monitoring system 106 may receive, from the engine monitoring system 104 of a machine 102, a notification that a measurement of an operating parameter of an engine of the machine is outside of an operational range of the machine. In some implementations, the engine monitoring system 104 may utilize the operational range to detect a potential failure of the engine and/or detect that the engine is underperforming or notify the remote monitoring system 106 when a measurement of an operating parameter is outside of the operational range (e.g., based on receiving the operational range from the remote monitoring system 106). The engine monitoring system 104 may notify the remote monitoring system 106 after each detected measurement outside of the operational range, after a threshold quantity of measurements are outside of the operational range (e.g., within a certain time period), and/or the like. Additionally, or alternatively, the engine monitoring system 104 may notify the remote monitoring system 106 each time the engine monitoring system 104 is communicatively coupled with the remote monitoring system 106 (e.g., after establishing a connection to network 112, after becoming within communication range of the network 112, or the like). The engine monitoring system 104 may send the notification based on a preconfigured schedule, periodically, or the like. In such cases, the remote monitoring system 106 may determine the operating profile of the engine (e.g., when the measurement is outside of the operational range). Based on the operating profile of the engine, the remote monitoring system 106 may analyze usage data that is associated with the engine of the machine 102 (e.g., usage data for engines that were operated according to a same operating profile) to identify a measurement pattern associated with the operating parameter. For example, the measurement pattern may identify timing information associated with the operating parameter being outside of an operational range (e.g., a timestamp of when the operating parameter was measured outside of the operational range, time delay or duration between a startup of the engine and when the operating parameter was measured outside of the operational range, and/or the like). In some implementations, the measurement pattern may be combined with one or more other measurement patterns for other operating parameters, to generate or form a usage pattern described herein.

Based on the measurement pattern and/or a usage pattern associated with the measurement pattern, the remote monitoring system 106 may determine a probability (e.g., based on a scoring system, a weighted average, and/or the like) that the engine (or a component of the engine) is going to fail within a threshold time period (e.g., a time period that is shorter than a regularly scheduled maintenance period). In such a case, if the probability satisfies a threshold probability of failure (e.g., 50% or greater, 75% or greater, 90% or greater), the remote monitoring system 106 may perform one or more actions to reduce the risk of failure and/or prevent the failure, as described herein. In some implementations, if durations of time between the operating parameter being outside of the operational range for a particular operating profile of an engine are increasing, the remote monitoring system 106 may identify a higher probability that the engine of the machine 102 (or vice versa) will fail. For example, the remote monitoring system 106 may determine an optimal operational configuration of the engine that indicates one more settings or operational ranges for certain operating parameters of the engine (e.g., including the operating parameter associated with a measurement provided by the engine monitoring system 104 or other operating parameters of the engine).

The remote monitoring system 106 may provide the optimal operational configuration to the engine monitoring system 104 (e.g., the engine monitoring system 104 that sent the notification) and/or to one or more other engine monitoring systems 104 for machines 102 that are associated with the machine 102 that provided the notification. In this way, the remote monitoring system 106 may determine an optimal operational configuration for an engine that identifies settings for the operating parameter and/or one or more other operating parameters of the engine that reduce a probability of failure of the engine in association with the operating parameter operating outside of an operational range.

As described herein, the remote monitoring system 106 may identify, from the usage data, a usage pattern of an engine. The usage pattern may indicate an amount of usage, a usage rate, a usage type, and/or the like of the engine. From the usage pattern and the measurement (which may be a most recently received datapoint of the usage pattern), the remote monitoring system 106 may determine a usage score that represents a remaining duration of operability of the engine. Based on the usage score, the remote monitoring system 106 may perform an action to prolong the life of the engine of the machine 102. For example, the remote monitoring system may use the maintenance management system 110 to cause the machine 102 to receive a maintenance service associated with the engine, such as through scheduling an appointment via the maintenance management system, transporting the machine 102 to a maintenance location that is managed by the maintenance management system, and/or the like. The maintenance management system 110 may include one or more devices and/or platforms that are configured to facilitate and/or provide maintenance service for the engines of the machines 102.

In some implementations, the remote monitoring system 106 may interact with one or more other systems of the machines 102. For example, based on predicting a [TIMELINE FOR A] potential or likely failure of the engine, the remote monitoring system 106 may transmit, to a user interface of the machine 102 (e.g., in an operator station of the machine 102), a message that indicates that the engine is likely to fail within a certain period of time. Additionally, or alternatively, the remote monitoring system 106 may provide information associated with the optimal operational configuration (e.g., within a message and/or other communication that can be displayed or announced via a user interface of the machine 102). For autonomous vehicles or semi-autonomous machines, the remote monitoring system 106 may transmit, to an engine controller of the machine 102, engine control instructions to cause the engine controller to control the engine of the machine 102 according to the optimal operational configuration. Additionally, or alternatively, the remote monitoring system 106, in association with the maintenance management system 110, may cause such autonomous vehicles to navigate to and/or toward a repair facility.

As indicated above, FIG. 1 is provided as an example. Other examples may differ from what is described with regard to FIG. 1.

FIG. 2 is a diagram of an example 200 associated with an engine monitoring system described herein. As shown in FIG. 2, example 200 may include one or more engine controllers 210 (referred to individually as "engine controller 210" and collectively as "engine controllers 210"), one or more sensors 220 (referred to individually as "sensor 220" and collectively as "sensors 220"), and an engine monitoring system 230. As shown in FIG. 2, the engine monitoring system 230 may include a processor 232, a memory 234, an event detection module 240, and an operating profile module 250. The engine monitoring system 230 As described herein, the engine monitoring system 230 is implemented in hardware via processor 232 and/or memory 234.

The engine controller 210 may be any type of device that may be used by the machine 102 to control an operating parameter of an engine of the machine 102. For example, engine controller 210 may include one or more actuators, switches, and/or the like that are capable of opening and/or closing a valve within the engine, adjusting a temperature within the engine (e.g., using a fan, a cooling system, and/or the like), adjusting a pressure within the engine, and/or the like.

The engine controller 210 may be associated with one or more adjustable parameters that may be optimized via an optimization process, as described herein. For example, a value of the adjustable parameter for the engine controller 210 may represent or indicate a setting of the engine controller 210, such as a position of an actuator, a length of time that a valve is open, a position of the valve, a temperature at which the engine operates, a pressure at which to compress air and/or fuel, and/or the like.

The sensors 220 may include any type of sensor configured to measure operating conditions of the engine. The sensors 220 may be sensors of a sensor system of the machine 102 and/or an engine of the machine 102. For example, the sensors 220 may include temperature sensors (e.g., to detect temperature of air, exhaust, a component, coolant, and/or the like), position sensors (e.g., to detect a position of a valve, an actuator, an engine part (e.g., a piston), and/or the like), speed sensors (e.g., to detect an engine speed, a machine speed, and/or the like), pressure sensors (e.g., to detect a measure of compression of air or exhaust of the engine), emissions sensors (e.g., to detect emission levels of the engine), and/or the like.

The sensor 220 may be used to sense one or more operating parameters that may be used in determining an operating state of the engine and/or a usage profile associated with the engine, as described herein. For example, a value of an operating parameter for one or more of the sensors 220 may represent or indicate a measurement of the sensor 220, such as a measured temperature by a temperature sensor, a measured timing of a valve opening and/or closing by a position sensor, a measured speed of an engine by a speed sensor, a measured position of an actuator by a position sensor, measured emissions by an emissions sensor, and/or the like.

The engine monitoring system 230 may be associated with an engine control module (ECM) of the machine 102 of FIG. 1. Processor 232 is implemented in hardware, firmware, and/or a combination of hardware and software. Processor 232 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 232 includes one or more processors capable of being programmed to perform a function. Memory 234 includes a random-access memory (RAM), a read only memory (ROM), and/or another type of dynamic or static storage device (e.g., a flash memory, a magnetic memory, and/or an optical memory) that stores information and/or instructions for use by processor 232 (e.g., information and/or instructions associated with event detection module 240, operating profile module 250, and/or the like).

Engine monitoring system 230 may also identify, obtain, and/or determine measurements for operating parameters that are associated with the engine, such as engine speed, fuel rate or quantity, injection timing, intake manifold temperature (IMAT), intake manifold pressure (IMAP), intake valve actuation (IVA) end of current, IVA timing, intake throttle valve position, injection air pressure, injection fuel pressure, torque delivered by the engine, total fuel injection quantity, exhaust pressure, a quantity of cylinders firing, oxygen/fuel molar ratio, ambient temperature, ambient pressure (e.g., barometric pressure), mass flow through a particulate collection device, exhaust backpressure valve position, shot mode, coolant temperature, total induction mass flow in multi-shot mode, dwell (e.g., length of time between shots) in multi-shot mode, and/or the like.

The event detection module 240 is configured to identify that a measurement of an operating parameter is outside of an operational range associated with the operating parameter for an operating state of the engine. The operating profile module 250 may store and/or maintain operational ranges for operating parameters for a plurality of different operating profiles of the engine. For example, a first operational range for a first operating profile that is designated to prolong the useful life of the engine of the machine 102 may be different than a second operational range for a second operating profile that is designated to provide enhanced performance of the engine of the machine 102. As a more specific example, an operating profile to prolong the life of the engine may have a relatively lower temperature range for a component of the engine relative to an operating profile to enhance performance of the engine (e.g., because higher temperatures, which are achieved during relatively higher performance, are more likely to cause damage to the component and/or the engine). The operating profile module 250 may store timing information identifying periods of operation during which the engine was operated according to the different operating profiles of the engine. In some implementations, the operating profile module may be updated according to instructions and/or information received from the remote monitoring system 106, as described herein (e.g., to alter an operational range for one or more operating parameters).

The communication component 260 enables engine monitoring system 230 to communicate with other devices, such as via a wired connection and/or a wireless connection. For example, communication component 260 may include a receiver, a transmitter, a transceiver, a modem, a network interface card, an antenna, and/or the like.

The user interface 270 may include one or more input components and/or one or more output components to facilitate an interaction between an operator and the machine. The user interface 270 may enable the engine monitoring system 230 to receive input, such as operator input and/or sensed inputs. For example, input component 250 may include a touch screen, a keyboard, a keypad, a mouse, a button, a microphone, a switch, a global positioning system component, and/or the like. The user interface 270 enables the engine monitoring system 230 to provide output, such as via a display, a speaker, and/or one or more light-emitting diodes.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
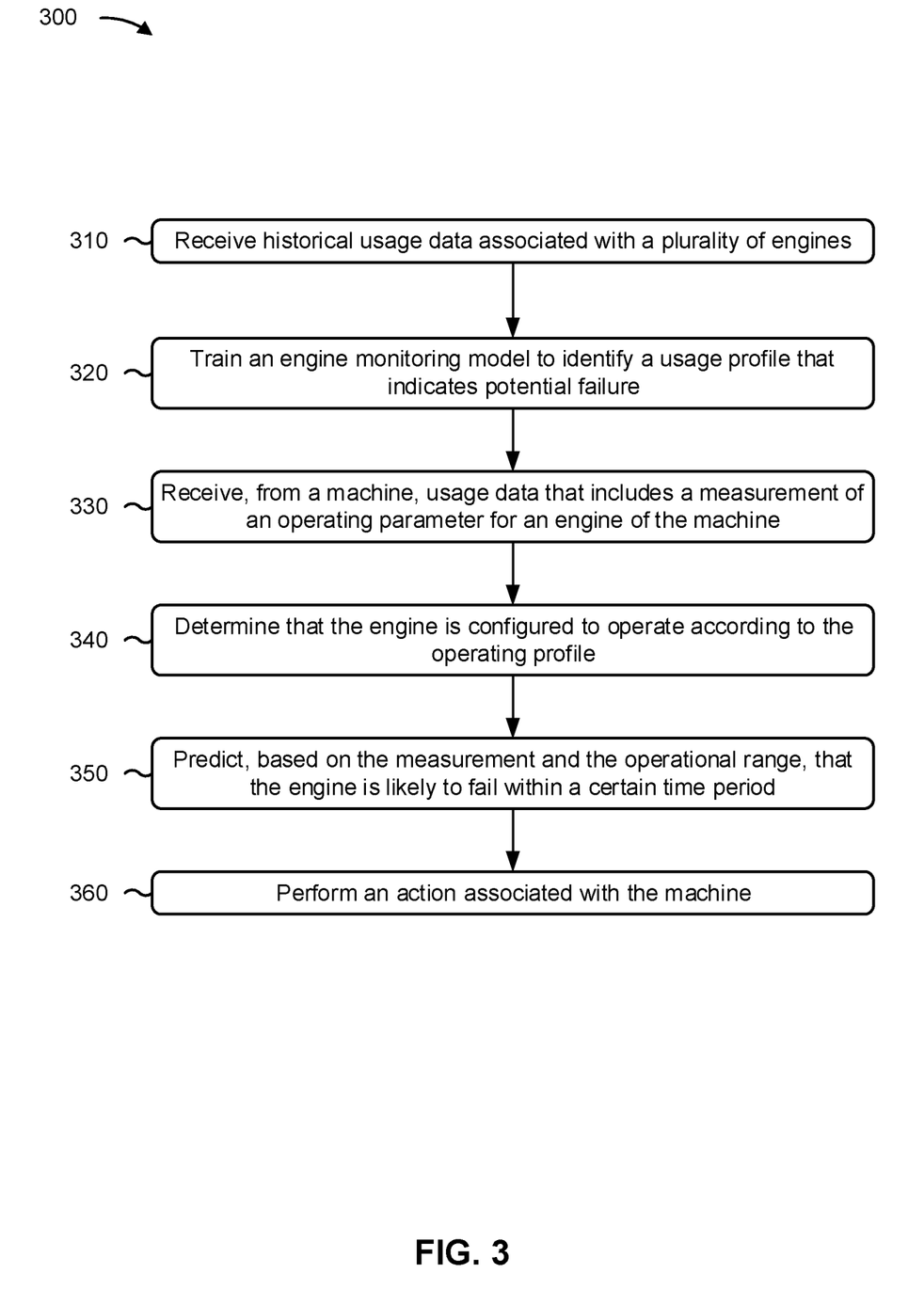
FIG. 3 is a flowchart of an example process associated with a monitoring system for engine performance and failure prediction.

FIG. 3 is a flowchart of an example process 300 associated with a monitoring system for engine performance and failure prediction. In some implementations, one or more process blocks of FIG. 3 may be performed by a remote monitoring system (e.g., remote monitoring system 106). In some implementations, one or more process blocks of FIG. 3 may be performed by another device or a group of devices separate from or including the remote monitoring system, such as an engine monitoring system (e.g., engine monitoring system 104 and/or engine monitoring system 230).

As shown in FIG. 3, process 300 may include receiving historical usage data associated with a plurality of engines (block 310). For example, the remote monitoring system may receive historical usage data associated with a plurality of engines, of an engine type, that are associated with a plurality of respective machines, as described above.

As further shown in FIG. 3, process 300 may include training an engine monitoring model to identify a usage profile that indicates potential failure (block 320). For example, the remote monitoring system may train, based on the historical usage data, an engine monitoring model to identify a usage profile that indicates potential failure of the engine type, wherein the usage profile identifies an operational range of an operating parameter for the engine type according to an operating profile associated with operating one or more of the plurality of engines, as described above.

The usage profile may identify an operational range of an operating parameter for the engine type according to an operating profile associated with operating one or more of the plurality of engines. The operating parameter may include at least one of a speed of a component of the engine, a temperature of a component of the engine, an emissions metric associated with exhaust from the engine, or an intake metric associated with an intake of the engine. The operating profile may be associated with at least one of a setting to optimize a performance metric of the engine, or a setting to optimize a useful life of the engine.

As further shown in FIG. 3, process 300 may include receiving, from a machine, usage data that includes a measurement of the operating parameter for an engine of the machine (block 330). For example, the remote monitoring system may receive, from a machine, usage data that includes a measurement of the operating parameter for an engine of the machine, as described above. The usage data may be received from an onboard engine monitoring system while the machine is under operation.

As further shown in FIG. 3, process 300 may include determining that the engine is configured to operate according to the operating profile (block 340). For example, the remote monitoring system may determine that the engine is configured to operate according to the operating profile, as described above.

As further shown in FIG. 3, process 300 may include predicting, based on the measurement and the operational range, that the engine is likely to fail within a certain time period (block 350). For example, the remote monitoring system may predict, based on determining that the engine is configured to operate according to the operating profile and based on the measurement and the operational range, that the engine is likely to fail within a certain time period, as described above.

As further shown in FIG. 3, process 300 may include performing an action associated with the machine (block 360). For example, the remote monitoring system may perform an action associated with the machine, as described above. The remote monitoring system may send, to a user interface of the machine, a notification that the engine is likely to fail The remote monitoring system may obtain confirmation information associated with determining that the engine is likely to fail, and retrain the engine monitoring model based on the confirmation information and the usage data. Additionally, or alternatively, the remote monitoring system may identify, from the usage data, a usage pattern of the engine. The remote monitoring system may determine, based on the usage pattern and the measurement, a usage score associated with the machine. The usage score may be representative of a remaining duration of operability of the engine. The remote monitoring system may determine that the usage score satisfies a maintenance threshold and/or cause the machine to receive a maintenance service associated with the engine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

During operation, machines may be controlled to use engines in various ways that cause wear and/or damage to the engines at different rates and/or in different ways depending on the characteristics of usage of the engine (e.g., operating profile, usage profile, usage type, and/or the like). While monitoring certain operating parameters relative to operational ranges can be used to detect a potential failure, such preconfigured ranges may be inaccurate or become obsolete over the course of usage of an engine.

As described herein, a remote monitoring system 106 is configured to obtain usage data from a plurality of machines 102 that are utilizing engines of a same type, determine operational ranges for operating parameters according to operating profiles of the engines during the usage, and perform one or more actions associated with predicting failures and/or reducing risk of failures of the engines. In some implementations, an engine monitoring model may include and/or be associated with a machine learning model that is configured to identify one or more usage or measurement patterns associated with an engine that indicate that a failure is likely within a certain time period. The remote monitoring system may determine an optimal operational configuration to reduce the risk of failure and/or prevent the failure with the certain time period. The remote monitoring system 106 may provide the optimal operational configuration to the machine 102 (e.g., via a user interface and/or a control system) to permit an operator of the machine 102 to adjust the usage of the machine 102 to prevent the failure and/or to cause a control system of the machine 102 to adjust operating parameters of the machine according to settings of the optimal operational configuration.

In this way, one or more examples described herein provide improved accuracy with respect to predicting failures and/or controlling an engine to prevent failures of an engine, thereby conserving resources associated with damage to the engine (e.g., hardware resources associated with replacing components of the engine, reducing downtime of the machine, and/or the like).

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, satisfying a threshold may, depending on the context, refer to a value being greater than the threshold, greater than or equal to the threshold, less than the threshold, less than or equal to the threshold, equal to the threshold, etc., depending on the context.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving historical usage data associated with a plurality of engines, of an engine type, that are associated with a plurality of respective machines;
   using a trained engine monitoring model to identify a usage profile that indicates potential failure of the engine type, the engine monitoring model having been trained based on the historical usage data,
   wherein the usage profile identifies an operational range of an operating parameter for the engine type according to an operating profile associated with operating one or more of the plurality of engines;
   receiving, from a machine, usage data that includes a measurement of the operating parameter for an engine of the machine;
   determining that the engine is configured to operate according to the operating profile; predicting, based on determining that the engine is configured to operate according to the operating profile and based on the measurement and the operational range, that the engine is likely to fail within a certain time period;
   identifying, from the usage data, a usage pattern of the engine;
   determining, based on the usage pattern and the measurement, a usage score associated with the machine,
   wherein the usage score is representative of a remaining duration of operability of the engine;
   determining that the usage score satisfies a maintenance threshold; and
   causing the machine to receive a maintenance service associated with the engine.

2. The method of claim 1, wherein the operating parameter comprises at least one of:
   a speed of a component of the engine;
   a temperature of a component of the engine;
   an emissions metric associated with exhaust from the engine; or an intake metric associated with an intake of the engine.

3. The method of claim 1, wherein the usage data is received from an onboard engine monitoring system while the machine is under operation.

4. The method of claim 1, wherein the operating profile is associated with at least one of:
   a setting to optimize a performance metric of the engine; or
   a setting to optimize a useful life of the engine.

5. The method of claim 1, further comprising:
obtaining confirmation information associated with determining that the engine is likely to fail; and
retraining the engine monitoring model based on the confirmation information and the usage data.

6. The method of claim 1, further comprising:
sending, to a user interface of the machine, a notification that the engine is likely to fail.

7. A method, comprising:
receiving historical usage data associated with a plurality of engines;
receiving, from a machine, usage data that includes a measurement of an operating parameter for an engine of the machine, the operating parameter being associated with an operational range for operating one or more of the plurality of engines;
determining that the engine is configured to operate according to an operating profile that is associated with operating one or more of the plurality of engines;
predicting, based on determining that the engine is configured to operate according to the operating profile and based on the measurement and the operational range, that the engine is likely to fail within a certain time period;
identifying, from the usage data, a usage pattern of the engine;
determining, based on the usage pattern and the measurement, a usage score associated with the machine,
wherein the usage score is representative of a remaining duration of operability of the engine; and
causing the machine to receive a maintenance service based on the usage score.

8. The method of claim 7, wherein the operating parameter comprises at least one of:
a speed of a component of the engine;
a temperature of a component of the engine;
an emissions metric associated with exhaust from the engine; or
an intake metric associated with an intake of the engine.

9. The method of claim 7, wherein the historical usage data is received from onboard engine monitoring systems of a plurality of respective machines, the onboard engine monitoring systems being communicatively coupled with a device that receives the historical usage data via a wireless communication network.

10. The method of claim 7, further comprising:
determining that the measurement is outside of the operational range;
analyzing usage data that is associated with the engine to identify a measurement pattern associated with the operating parameter;
determining a probability that the engine is going to fail based on the measurement pattern; and
determining that the engine is likely to fail based on the probability satisfying a threshold probability of failure.

11. The method of claim 7, wherein the operating profile is a first operating profile, and the operational range is a first operational range determined according to usage of a first subset of engines, and
wherein a second subset of the engines is associated with a second operational profile, and a second operating range for the operating parameter is determined according to usage of the second subset of the engines.

12. The method of claim 7, further comprising:
identifying, from the usage data, a usage pattern of the engine;
determining, based on the usage pattern and the measurement, an optimal operational configuration for the engine; and
transmitting, to an engine controller of the machine, engine control instructions to cause the engine controller to control the engine according to the optimal operational configuration.

13. The method of claim 7, further comprising:
sending, to a user interface of the machine, a notification that the engine is likely to fail.

14. A method, comprising:
receiving historical usage data associated with a plurality of engines;
using, based on the historical usage data, a trained engine monitoring model to identify a usage profile that indicates a potential failure of an engine type,
wherein the usage profile identifies an operational range associated with operating one or more of the plurality of engines;
receiving, from a machine, usage data that includes a measurement of an operating parameter for an engine of the machine;
determining that the engine is configured to operate according to an operating profile, the operating profile being associated with a request to optimize performance, to optimize useful life, or to balance performance and useful life;
predicting, based on determining that the engine is configured to operate according to the operating profile and based on the measurement and the operational range, that the engine is likely to fail within a certain time period; and
determining an optimal operational configuration based on the measurement, wherein the optimal operational configuration identifies settings for one or more other operating parameters of the engine that reduce a probability of failure of the engine in association with the operating parameter.

15. The method of claim 14, wherein the operating parameter comprises at least one of:
a speed of a component of the engine;
a temperature of a component of the engine;
an emissions metric associated with exhaust from the engine; or
an intake metric associated with an intake of the engine.

16. The method of claim 14, further comprising:
transmitting, to an engine controller of the machine, engine control instructions to cause the engine controller to control the engine according to the optimal operational configuration.

17. The method of claim 14, further comprising:
transmitting, to a user interface of the machine, a message that indicates the optimal operational configuration.

18. The method of claim 14, further comprising:
sending, to a user interface of the machine, a notification that the engine is likely to fail.

19. A method, comprising:
receiving historical usage data associated with a plurality of engines;
using, based on the historical usage data, a trained engine monitoring model to identify a usage profile that indicates a potential failure of an engine type,
wherein the usage profile identifies an operational range associated with operating one or more of the plurality of engines;

receiving, from a machine, usage data that includes a measurement of an operating parameter for an engine of the machine;

determining that the engine is configured to operate according to the operating profile, the operating profile being associated with a request to optimize performance, to optimize useful life, or to balance performance and useful life;

predicting, based on determining that the engine is configured to operate according to the operating profile and based on the measurement and the operational range, that the engine is likely to fail within a certain time period; and wherein the operating profile is associated with the request to optimize useful life, the request to optimize useful life being a request to prevent changes in operating parameters that cause damage to the engine.

* * * * *